US007821176B2

(12) United States Patent  
Ionel et al.

(10) Patent No.: US 7,821,176 B2
(45) Date of Patent: Oct. 26, 2010

(54) ELECTRIC MOTOR, STATOR FOR AN ELECTRIC MOTOR AND METHOD OF MANUFACTURING SAME

(75) Inventors: Dan M. Ionel, Fox Point, WI (US); Alan E. Lesak, Franklin, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 212 days.

(21) Appl. No.: 12/135,750

(22) Filed: Jun. 9, 2008

(65) Prior Publication Data

US 2008/0303369 A1 Dec. 11, 2008

Related U.S. Application Data

(60) Provisional application No. 60/942,790, filed on Jun. 8, 2007.

(51) Int. Cl.
*H02K 3/06* (2006.01)

(52) U.S. Cl. .................. 310/216.026; 310/216.033; 310/216.034

(58) Field of Classification Search .......... 310/216.004, 310/216.009, 216.018, 216.019, 216.021–216.029, 310/216.031–216.037, 216.097, 216.111
See application file for complete search history.

(56) References Cited

U.S. PATENT DOCUMENTS

| | | | |
|---|---|---|---|
| 1,934,981 A | 11/1933 | Johnson | |
| 3,390,289 A | 6/1968 | Dijken et al. | |
| 3,440,460 A | 4/1969 | Postema | |
| 3,443,137 A | 5/1969 | McElroy | |
| 3,685,142 A * | 8/1972 | Deming | 29/598 |
| 3,694,903 A | 10/1972 | Deming | |
| 3,742,269 A | 6/1973 | Holper et al. | |
| 3,813,763 A | 6/1974 | Church | |
| 3,963,949 A | 6/1976 | Church | |
| 3,983,621 A | 10/1976 | Donahoo | |
| 4,080,725 A | 3/1978 | Cronk | |
| 4,134,035 A | 1/1979 | Donahoo | |
| 4,469,970 A | 9/1984 | Neumann | |
| 5,176,946 A | 1/1993 | Wieloch | |
| 5,604,971 A | 2/1997 | Steiner | |
| 5,619,086 A * | 4/1997 | Steiner | 310/216.037 |
| 5,627,424 A * | 5/1997 | Steiner | 310/216.026 |
| 5,640,752 A | 6/1997 | Steiner | |
| 5,659,218 A | 8/1997 | Kliman et al. | |
| 5,671,526 A | 9/1997 | Merlano | |
| 5,729,071 A * | 3/1998 | Steiner | 310/216.022 |
| 5,767,606 A | 6/1998 | Bresolin | |
| 5,853,643 A | 12/1998 | Bauer | |

(Continued)

FOREIGN PATENT DOCUMENTS

JP 53086502 U 7/1978

(Continued)

*Primary Examiner*—Dang D Le
(74) *Attorney, Agent, or Firm*—Michael Best & Friedrich LLP

(57) ABSTRACT

An electric machine has a rotor and includes a first portion that is substantially rectangular and includes a rotor aperture configured to receive a portion of the rotor. A second portion is separate from and connected to the first portion. The second portion is substantially U-shaped and includes a first leg, a second leg, and a base. A first coil surrounds a portion of the first leg and a second coil surrounds a portion of the second leg.

37 Claims, 21 Drawing Sheets

U.S. PATENT DOCUMENTS

| | | |
|---|---|---|
| 5,927,249 A | 7/1999 | Ackermann et al. |
| 5,952,754 A | 9/1999 | Mok |
| 6,012,217 A | 1/2000 | Kliman et al. |
| RE36,545 E | 2/2000 | Steiner |
| 6,069,428 A | 5/2000 | Nelson |
| 6,414,408 B1 * | 7/2002 | Erdman et al. ............ 310/68 R |
| 6,534,892 B2 | 3/2003 | Braun et al. |
| 6,630,766 B1 | 10/2003 | Kim et al. |
| 6,710,501 B1 | 3/2004 | Kusumoto et al. |
| 6,741,005 B2 | 5/2004 | Vohlgemuth |
| 6,777,852 B2 | 8/2004 | Ishikawa et al. |
| 6,975,049 B2 | 12/2005 | Ionel et al. |
| 6,982,532 B2 | 1/2006 | Mullin et al. |
| 2002/0047475 A1 | 4/2002 | Kusumoto et al. |
| 2005/0067912 A1 | 3/2005 | Murakami et al. |
| 2005/0093381 A1 | 5/2005 | Ionel et al. |
| 2005/0223541 A1 | 10/2005 | Ionel et al. |
| 2006/0038452 A1 | 2/2006 | Lesak |
| 2006/0082240 A1 | 4/2006 | Lin et al. |

FOREIGN PATENT DOCUMENTS

| | | |
|---|---|---|
| JP | 58036144 A | 3/1983 |

* cited by examiner

US 7,821,176 B2

ELECTRIC MOTOR, STATOR FOR AN ELECTRIC MOTOR AND METHOD OF MANUFACTURING SAME

RELATED APPLICATION DATA

The present application claims the benefit of co-pending provisional patent application Ser. No. 60/942,790, filed Jun. 8, 2007, the subject matter of which is hereby fully incorporated by reference.

BACKGROUND

The invention relates to a motor that includes a stator formed to reduce scrap. More particularly, the present invention relates to a C-frame motor and a two bobbin stator for a C-frame motor.

C-frame motors are inexpensive motors that are produced in large numbers for use in a number of low power and torque applications.

Conventional C-frame motors employ stator laminations as shown in FIG. 1. In order to reduce the steel scrap to a minimum, constraints are imposed on some of the dimensions of the magnetic circuit, for example on the length and the width of the I-bar, especially with respect to the dimensions of the window for coils, i.e. the distance between the C-frame legs and the width of the legs themselves. The stator core and a single coil are formed and assembled as shown in FIG. 2.

Major disadvantages of the conventional C-frame motor construction include the limited degrees of freedom in optimally designing the stator core for lowest cost and/or best performance as well as the relatively high winding resistance and high electric wire consumption due to the relatively high mean turn length in the single coil employed.

SUMMARY

The present invention provides a motor that includes a stator core formed from a plurality of laminations. Each of the laminations includes a first lamination piece and a second lamination piece that are formed separately and that are arrangeable to minimize scrap. The second lamination piece is also formed to allow for the use of one coil on each of two legs.

In one construction, the invention provides an electric machine having a rotor. The electric machine includes a first portion that is substantially rectangular and includes a rotor aperture configured to receive a portion of the rotor. A second portion is separate from and connected to the first portion. The second portion is substantially U-shaped and includes a first leg, a second leg, and a base. A first coil surrounds a portion of the first leg and a second coil surrounds a portion of the second leg.

In another construction, the invention provides an electric machine having a rotor. The electric machine includes a first portion that is substantially rectangular and includes a rotor aperture configured to receive a portion of the rotor. A second portion is separate from and connected to the first portion. The second portion includes a plurality of laminations stacked in a stackwise direction. Each lamination includes a first leg having a first width, a second leg having a second width, and a base. The base is sized to define a space between the first leg and the second leg that is about equal to the sum of the first width and the second width. A coil surrounds a portion of one of the first leg and the base.

In still another construction, the invention provides an electric machine that includes a first portion including a first quantity of first laminations stacked in a stackwise direction. Each first lamination is substantially rectangular and including a first tab, a second tab, and a rotor aperture. A rotor is at least partially disposed within the rotor aperture and rotatable about an axis that extends in the stackwise direction. A second portion includes a second quantity of second laminations stacked in the stackwise direction. Each second lamination includes a first leg having a first slot, a second leg having a second slot, and a base. A portion of the first slots is configured to receive a portion of the first tabs, and a portion of the second slots is configured to receive a portion of the second tabs to connect the second quantity of second laminations to the first quantity of first laminations. A coil surrounds a portion of one of the first leg and the base.

BRIEF DESCRIPTION OF THE DRAWINGS

FIG. 10 is a front view of yet another lamination suitable for use in the motor of FIG. 4;

FIG. 12 is a front view of yet another lamination suitable for use in the motor of FIG. 4;

FIG. 14 is a front view of a stator core suitable for use in the motor of FIG. 4;

FIG. 15 is a front view of a stator core suitable for use in the motor of FIG. 4;

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

Figure 1:
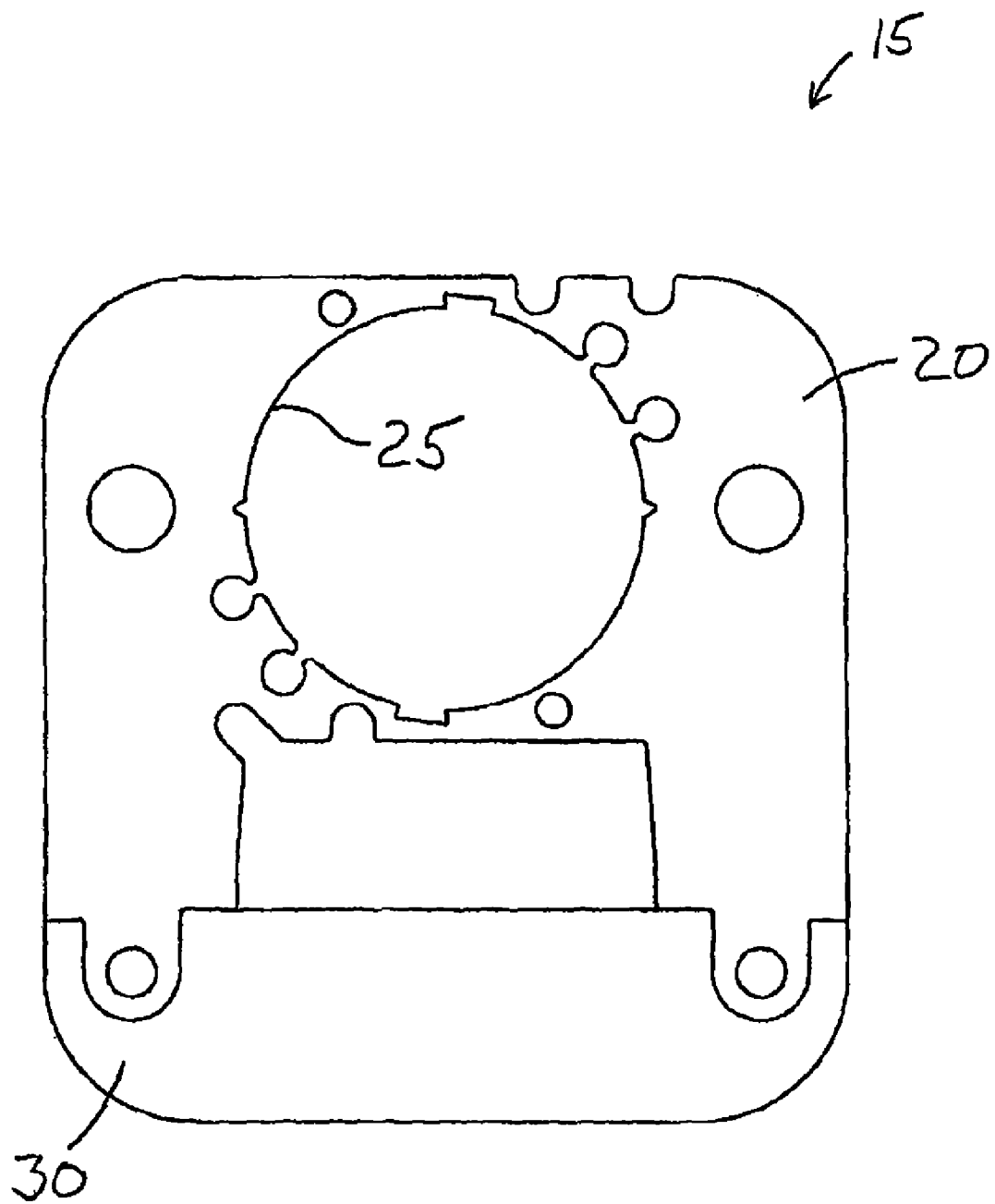
FIG. 1 is a front view of a prior art stator lamination for use in a prior art C-frame motor.
Figure 2:
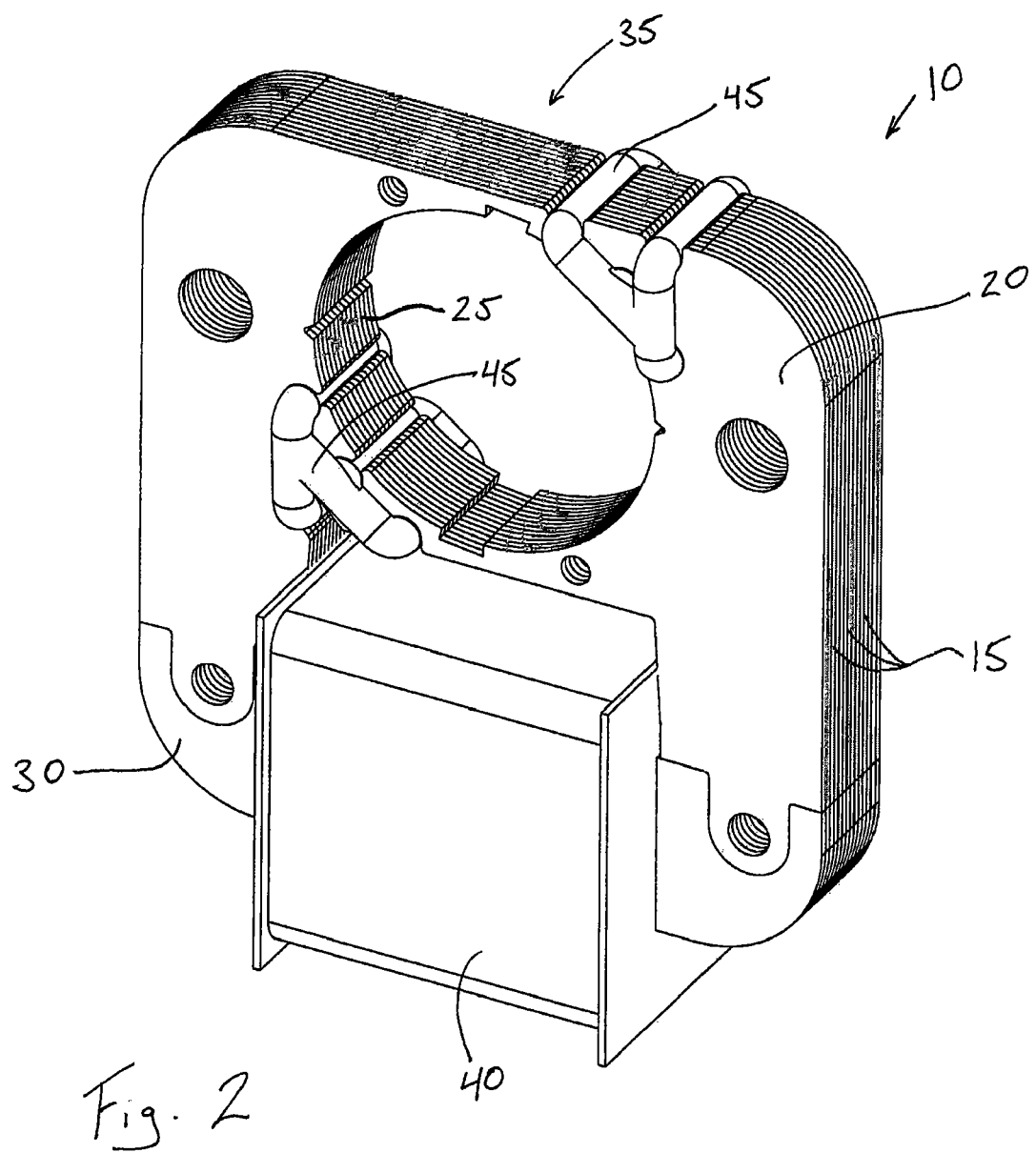
FIG. 2 is a perspective view of a prior art C-frame motor stator.

As noted, FIGS. 1 and 2 illustrate a prior art shaded-pole C-frame motor stator 10 that includes stator laminations 15 formed as two separate pieces. A first piece 20 is substantially C-shaped and includes a substantially circular aperture 25 sized to receive a rotor 26 (shown in FIG. 3). The rotor 26 typically includes permanent magnets that interact with the stator to produce rotation of the rotor 26 and useable shaft power. A second piece or I-bar 30 is substantially rectangular and engages the first piece 20 to completely define the lamination 15.

As illustrated in FIG. 2, several of the laminations 15 of FIG. 1 are stacked to define a core 35, and a single coil 40 is positioned around the I-bar laminations 30. In addition, one or more shading coils 45 are employed and are positioned as required if a shaded-pole motor is desired. The stator shown in FIG. 2 comprises one coil 40 and two shading coils 45 and is suitable for a two-pole motor.

Figure 3:
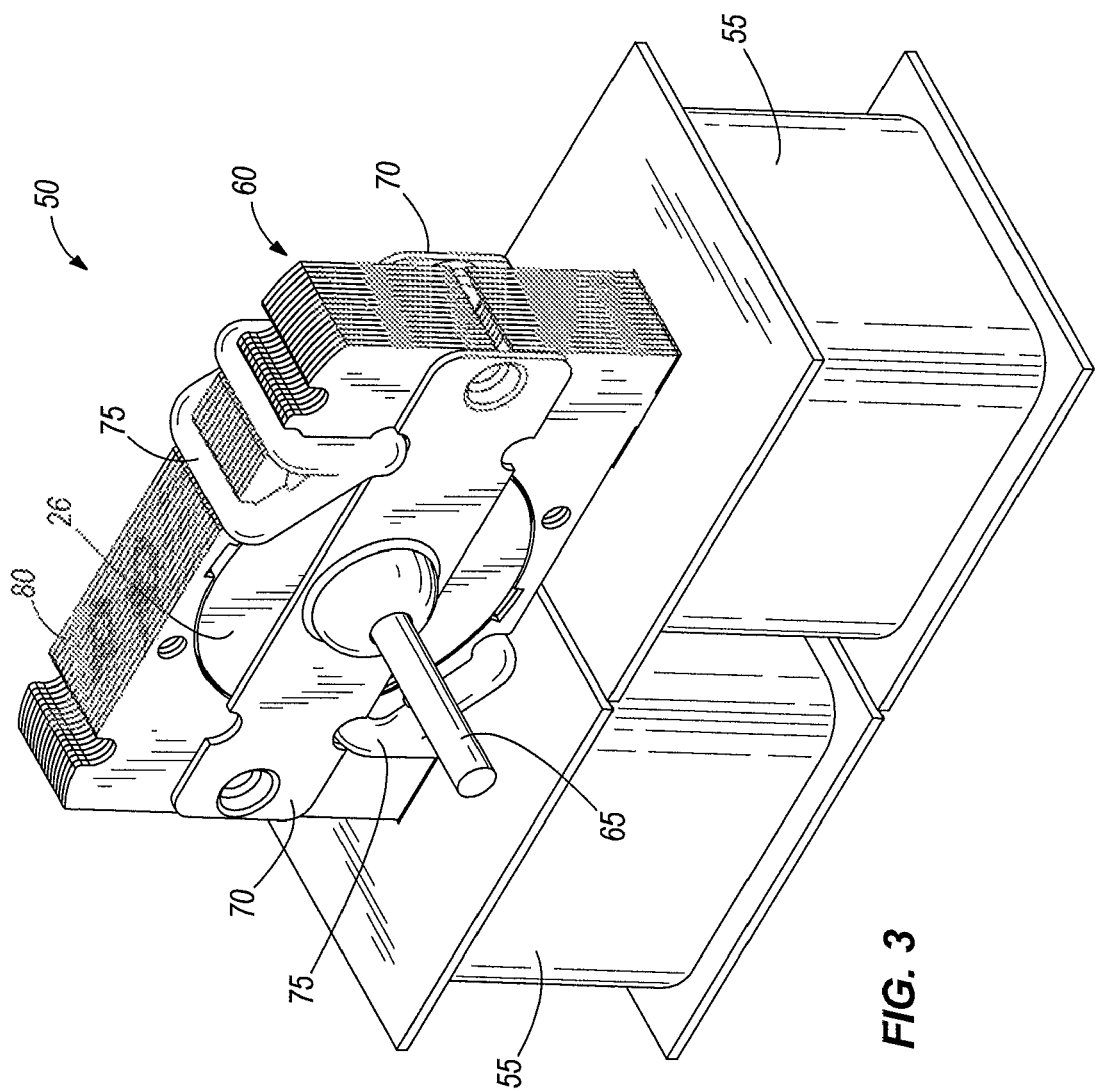
FIG. 3 is a perspective view of a C-frame motor embodying the invention.
Figure 4:
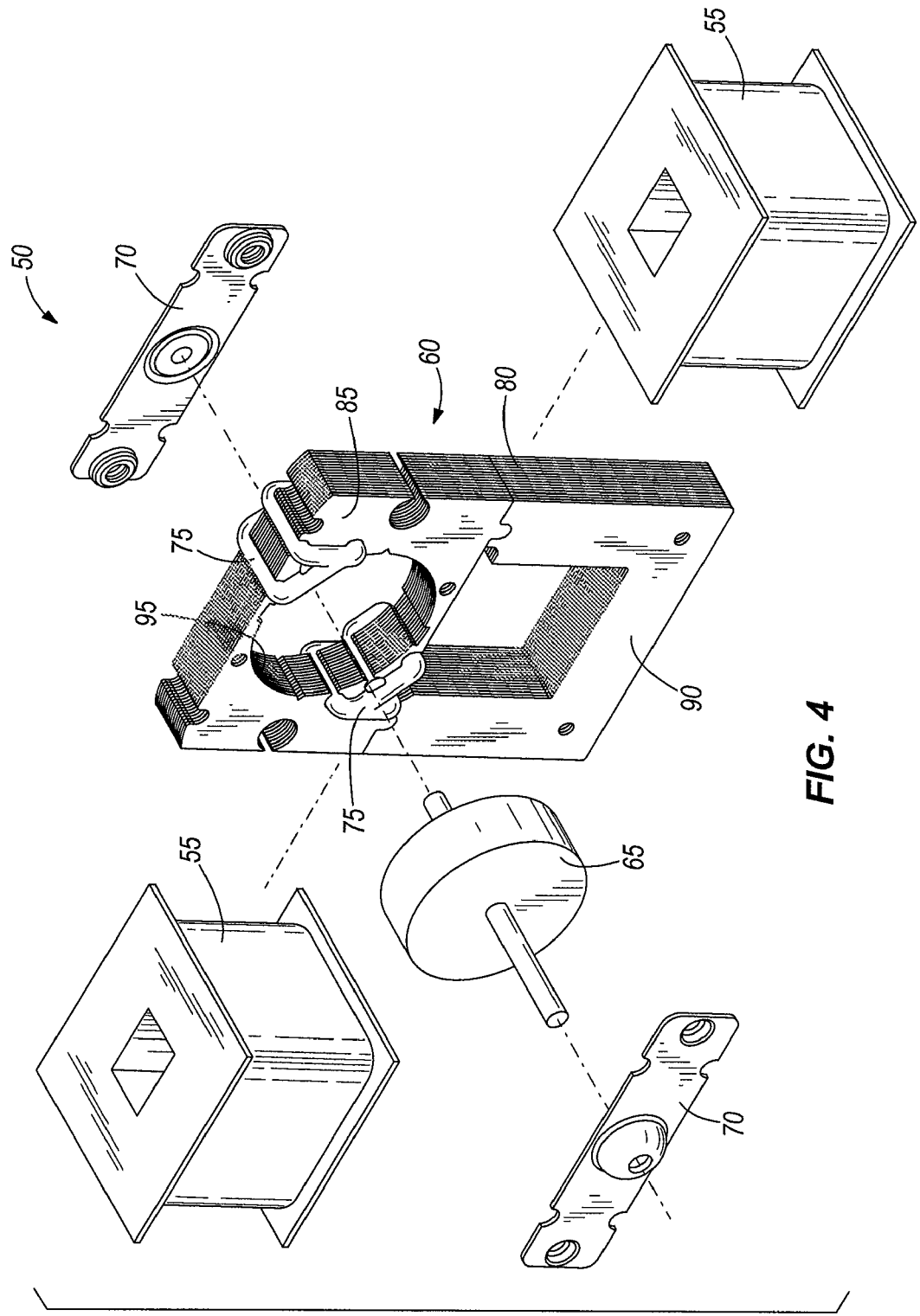
FIG. 4 is an exploded view of the C-frame motor of FIG. 3 including a stator core having a plurality of laminations.

FIGS. 3 and 4 illustrate a two bobbin C-frame motor 50 embodying the invention. Two coils 55 are used in the preferred construction and each will have a smaller mean turn length than the single coil 40 of the conventional C-frame construction of FIG. 2. In a preferred construction, each coil 55 of FIGS. 3 and 4 includes about half the number of turns as the coil 40 of FIG. 2, thereby producing a motor 50 that has substantially the same number of turns of the motor 10 of FIG. 2.

As illustrated in FIGS. 3 and 4, the motor 50 includes a stator core 60, the two coils 55 (typically wound onto bobbins of an electrically insulating material), a rotor 65, and two rotor support members 70 or end brackets that attach to the stator core 60 to support the rotor 65 for rotation. In addition, shading coils 75 are positioned on the stator core 60 as required to define shaded-poles if a shaded-pole motor is desired. The stator shown in FIG. 2 comprises two coils 55 and two shading coils 75 and is suitable for a two-pole motor.

Figure 5:
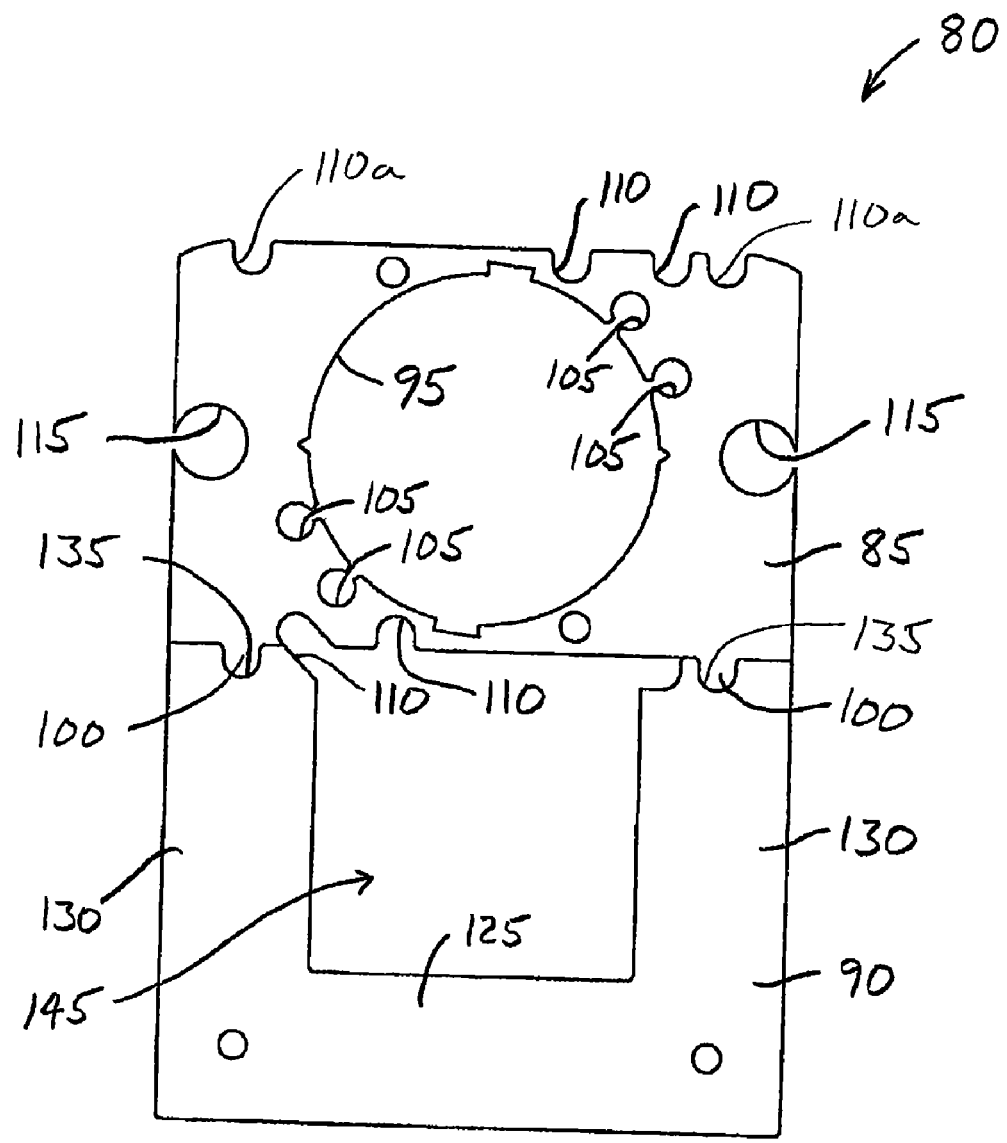
FIG. 5 is a front view of one of the stator laminations of FIG. 4 including a first lamination piece and a second lamination piece.
Figure 6:
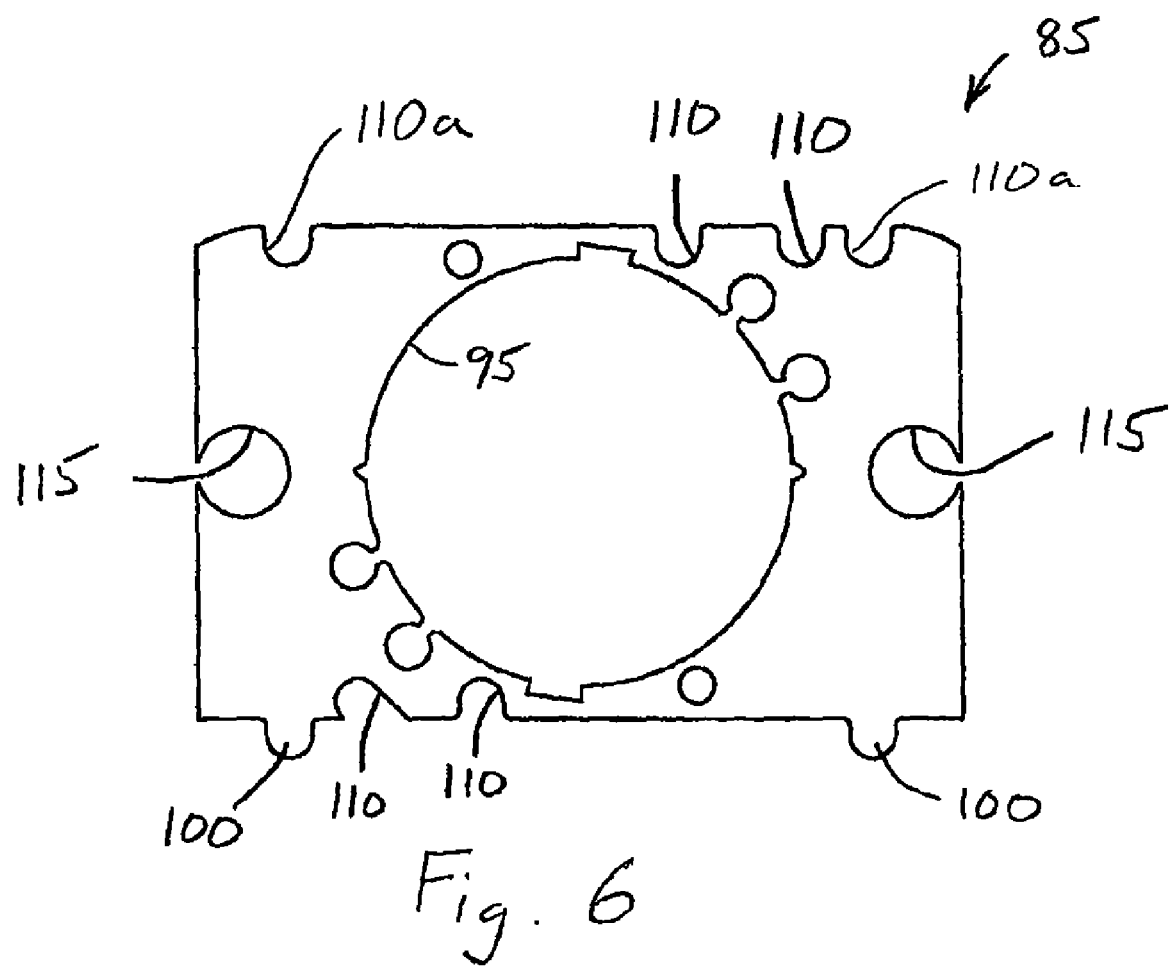
FIG. 6 is a front view of the first lamination piece of FIG. 5.

The stator core 60 includes several laminations 80 that are stacked in a stackwise (axial) direction. As illustrated in FIG. 5, at least some of the laminations 80 include a first lamination piece 85 and a second lamination piece 90. The first lamination piece 85, which is shown in FIG. 6, has a substantially rectangular outer profile and includes a substantially circular aperture 95 sized to receive the rotor 65. In constructions in which the laminations 80 are punched and the rotor 65 includes a core formed from punched rotor laminations, the material removed from the first lamination piece 85 to define the circular aperture 95 can be employed to form the rotor core laminations, thereby reducing scrap.

The first lamination piece 85 also includes tabs 100 that extend in a direction toward the second lamination piece 90 to improve the attachment between the first lamination piece 85 and the second lamination piece 90. In addition, apertures 105 are positioned near the circular aperture 95, and slots 110 are positioned on two of the outer surfaces to receive the shading coils 75 if they are employed. In addition, the first lamination piece 85 includes two substantially circular side apertures 115 disposed near the outer most side surfaces and sized to receive one of two attachment bolts. The attachment bolts attach the support members 70 and the laminations 80 to one another.

Figure 6A:
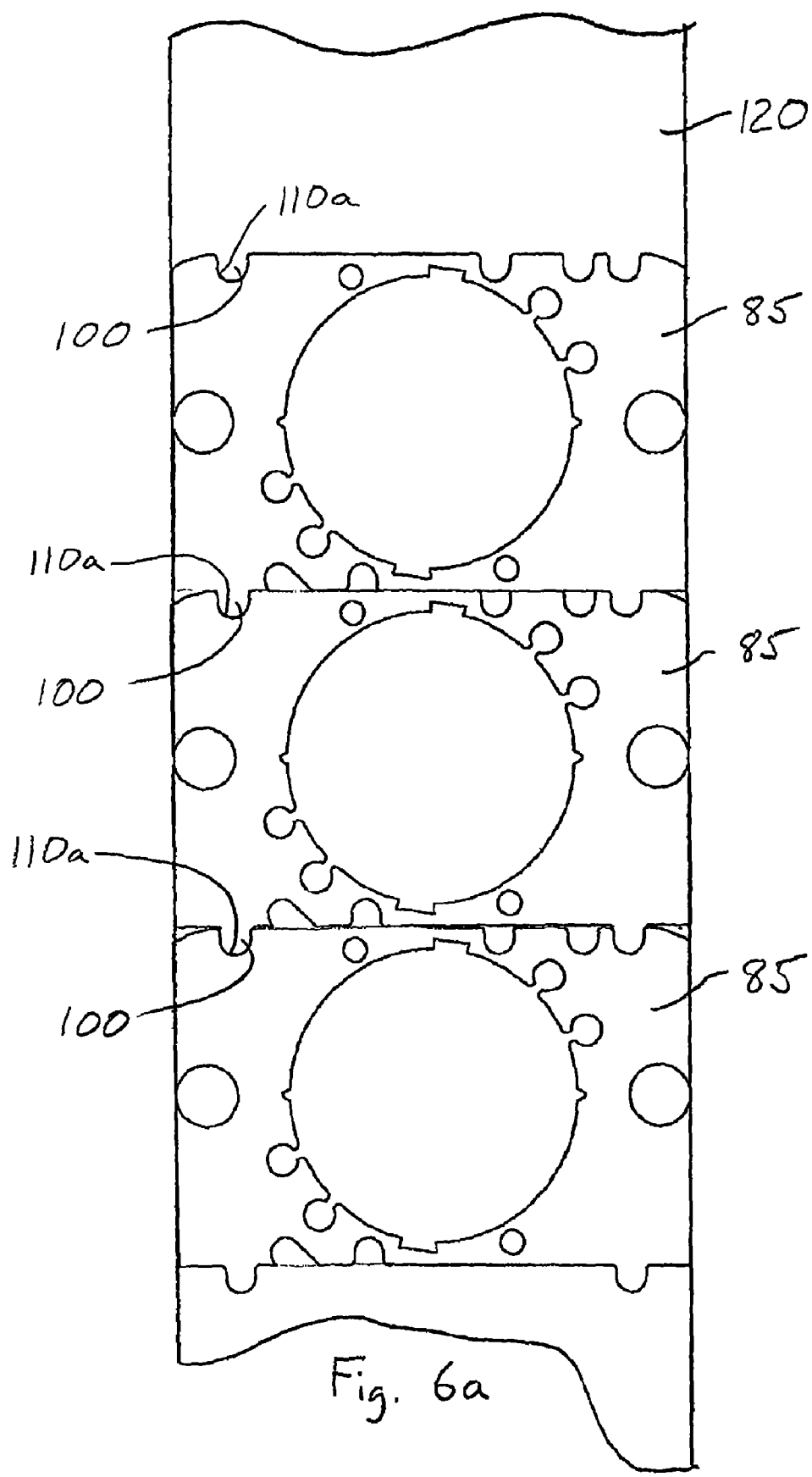
FIG. 6a is a front view of a plurality of first lamination pieces arranged on a strip of material for stamping.

In preferred constructions, the first lamination pieces 85 are punched from an electrical grade (ferromagnetic) steel in a manner that positions laminations 85 immediately adjacent one another to reduce the amount of scrap between adjacent laminations 85. FIG. 6a shows a plurality of first lamination pieces 85 illustrating how they would be punched from a strip 120 of suitable material. In one arrangement, the strip of material 120 is the same width as the first lamination piece 85, thereby eliminating any scrap on the sides of the first lamination pieces 85. Of course, other arrangements could stamp multiple rows of first lamination pieces 85 from a wider piece of material.

To further minimize the scrap, the tabs 100 that enhance the attachment of the first lamination piece 85 to the second lamination piece 90 are dimensioned and positioned such as to correspond with outer slots 10a adjacent one of the shading coils 75. In this manner, several first lamination pieces 85 of the type shown in FIG. 6 can be nested vertically as shown in FIG. 6a and/or can be punched with minimal scrap in a vertical progression/feeding direction.

Figure 7:
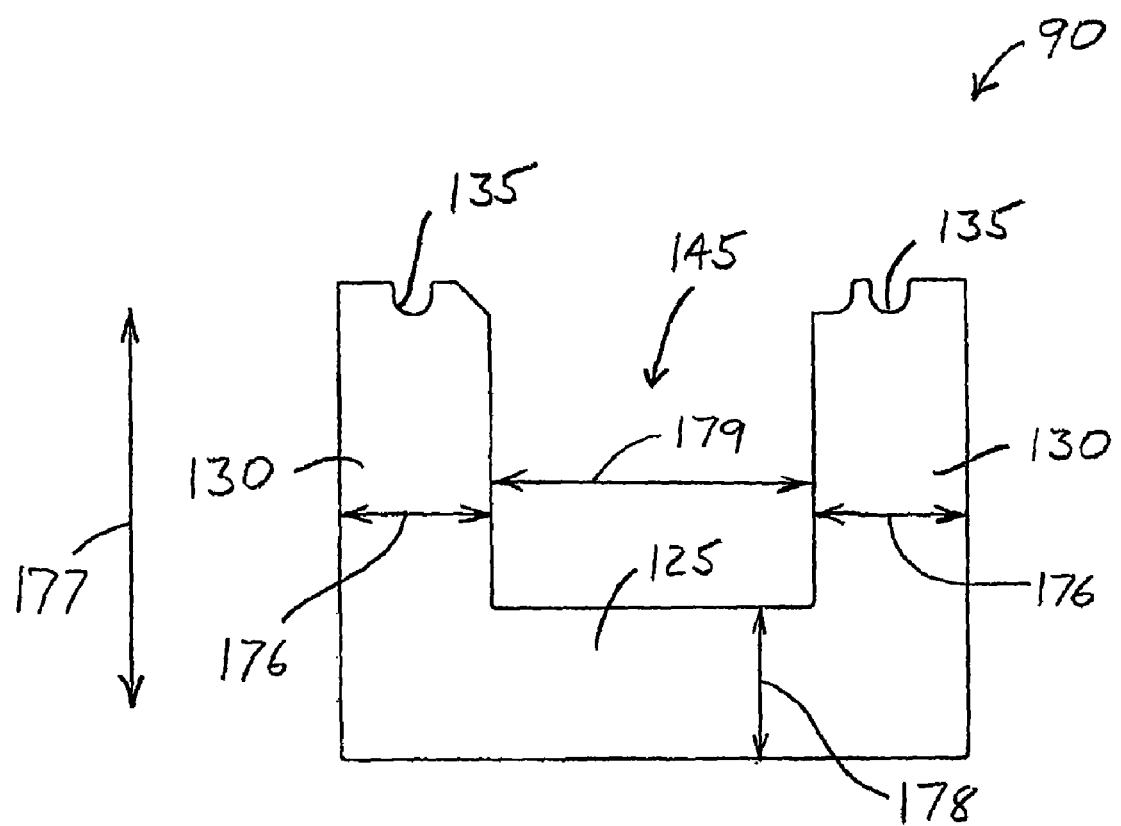
FIG. 7 is a front view of the second lamination piece of FIG. 5.

The second lamination piece 90, which is shown in FIG. 7, has a substantially U-shaped profile that includes a base 125 and two legs 130. A slot 135 is positioned at the end of each leg 130 and is sized to engage one of the tabs 100 of the first lamination piece 85 to attach the first lamination piece 85 to the second lamination piece 90. The dimensions of the base 125 and the legs 130 are selected to reduce the scrap produced when the second lamination pieces 90 are punched from a strip 140 of electrical grade steel following an arrangement similar to that illustrated in FIG. 8.

Figure 8:
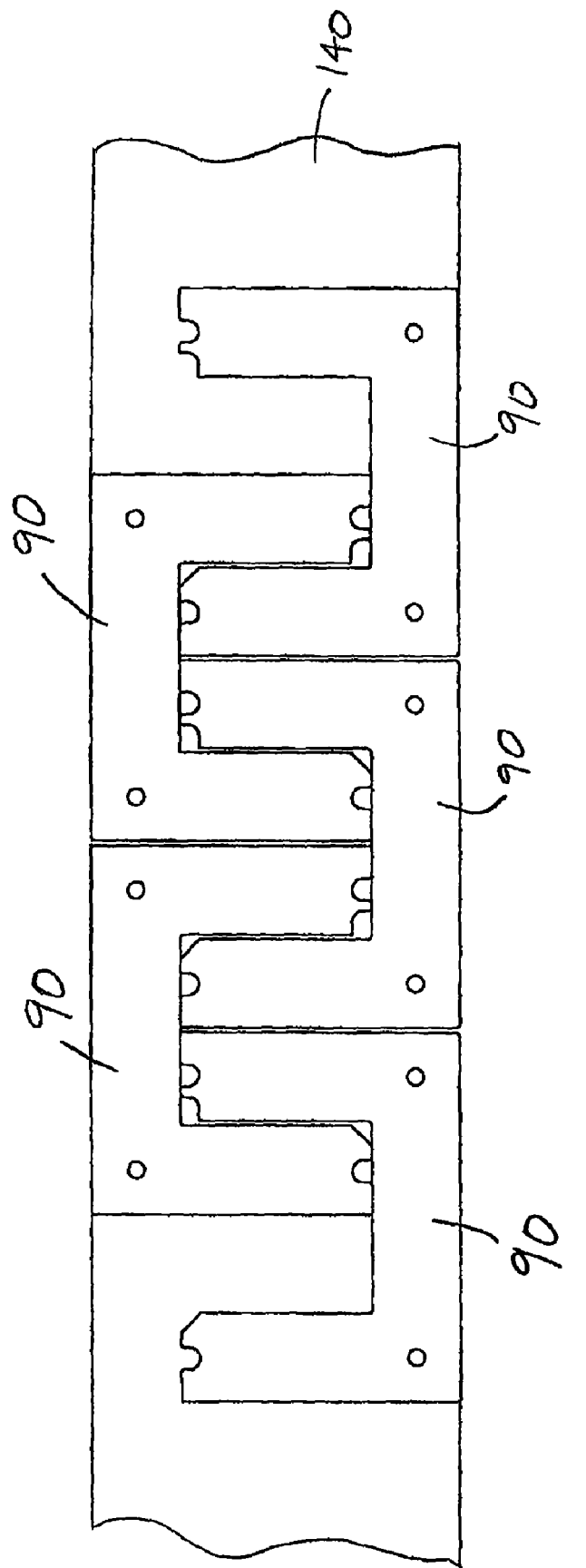
FIG. 8 is a front view of a plurality of second lamination pieces arranged on a strip of material for stamping.

Specifically, the base 125 is sized to define a space 145 between the legs 130 having a width 179 that is equal to, or slightly greater than two times the width 176 of the legs 130. This size allows for the arrangement of second lamination pieces 90 illustrated in FIG. 8. In another construction, the space 145 between the legs 130 is about equal to the width of a leg 130. In this construction, one leg 130 is formed in the space 145 between the legs 130 of the adjacent second lamination piece 90 rather than the two legs 130 as illustrated in FIG. 8.

In one construction, the second lamination pieces 90 are stamped from a strip of material 140 that has a width that is about equal to the depth of the space 145 plus twice the thickness 178 of the base 125. This allows for the stamping of the second lamination pieces 90 with little or no scrap in the width direction. Of course, other arrangements could stamp multiple rows of second lamination pieces 90 from a wider piece of material.

Figure 20:
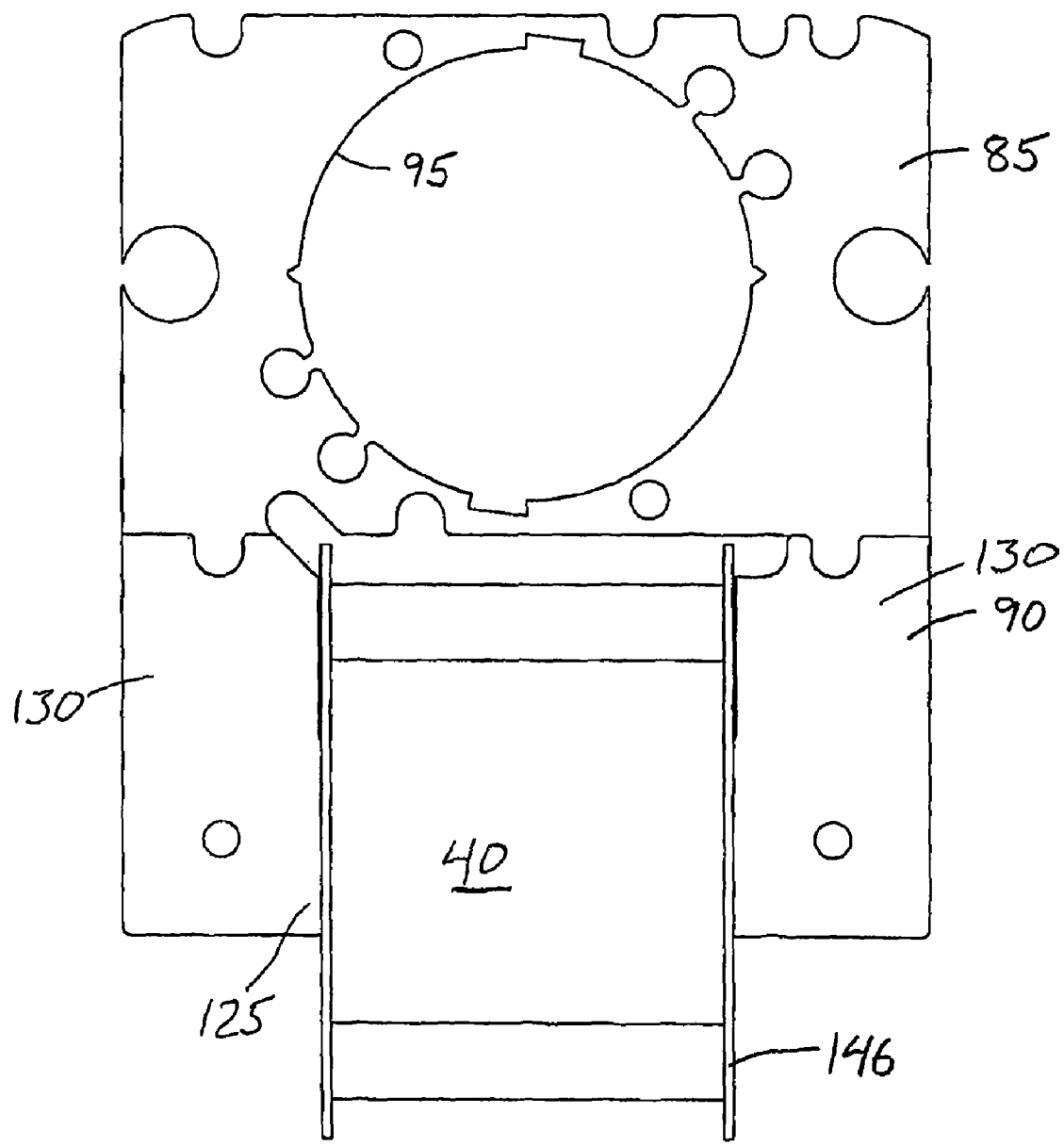
FIG. 20 is a front view of the stator core and a single-coil for another motor construction.

The depth of the space 145 is also large enough to allow for the placement of the two bobbins or coils 55 around the legs 130, rather than the typical placement of a single coil 40 around the base 125. Of course, a single coil could be positioned around one of the legs 130 or the base 125 if desired. For example, in FIG. 20, the upper part lamination 85 is substantially the same as in the construction of FIG. 5, while the lower portion lamination 90 has a similar U-shape and shorter legs 130. A bobbin 146 of electrically insulating material, such as plastic, is fitted onto the base 125, for example, by using a two part construction or by injection molding onto the core, and is wound with magnetic wire to produce a construction with only one coil 40.

Figure 9:
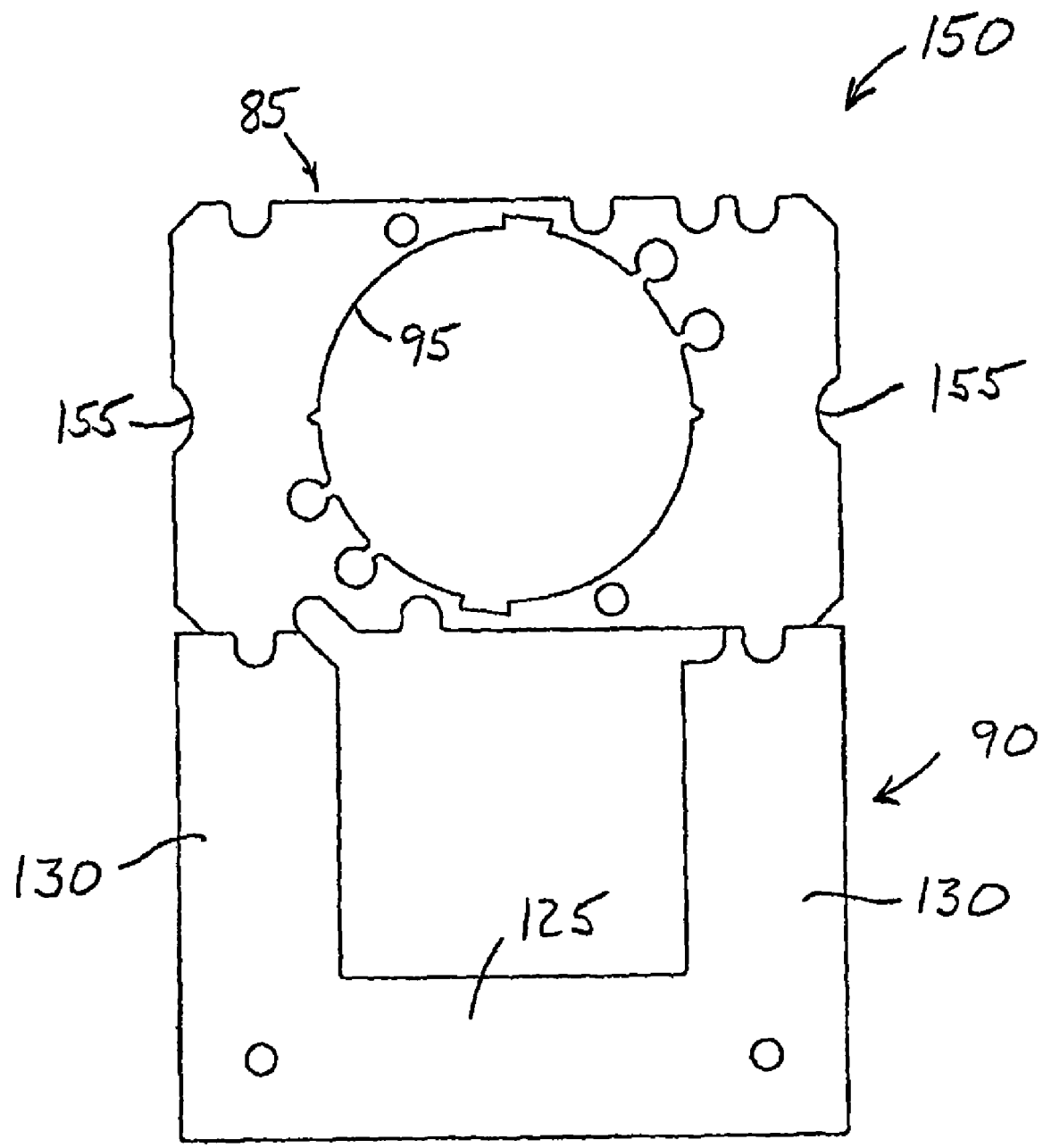
FIG. 9 is a front view of another lamination suitable for use in the motor of FIG. 4.
Figure 70:
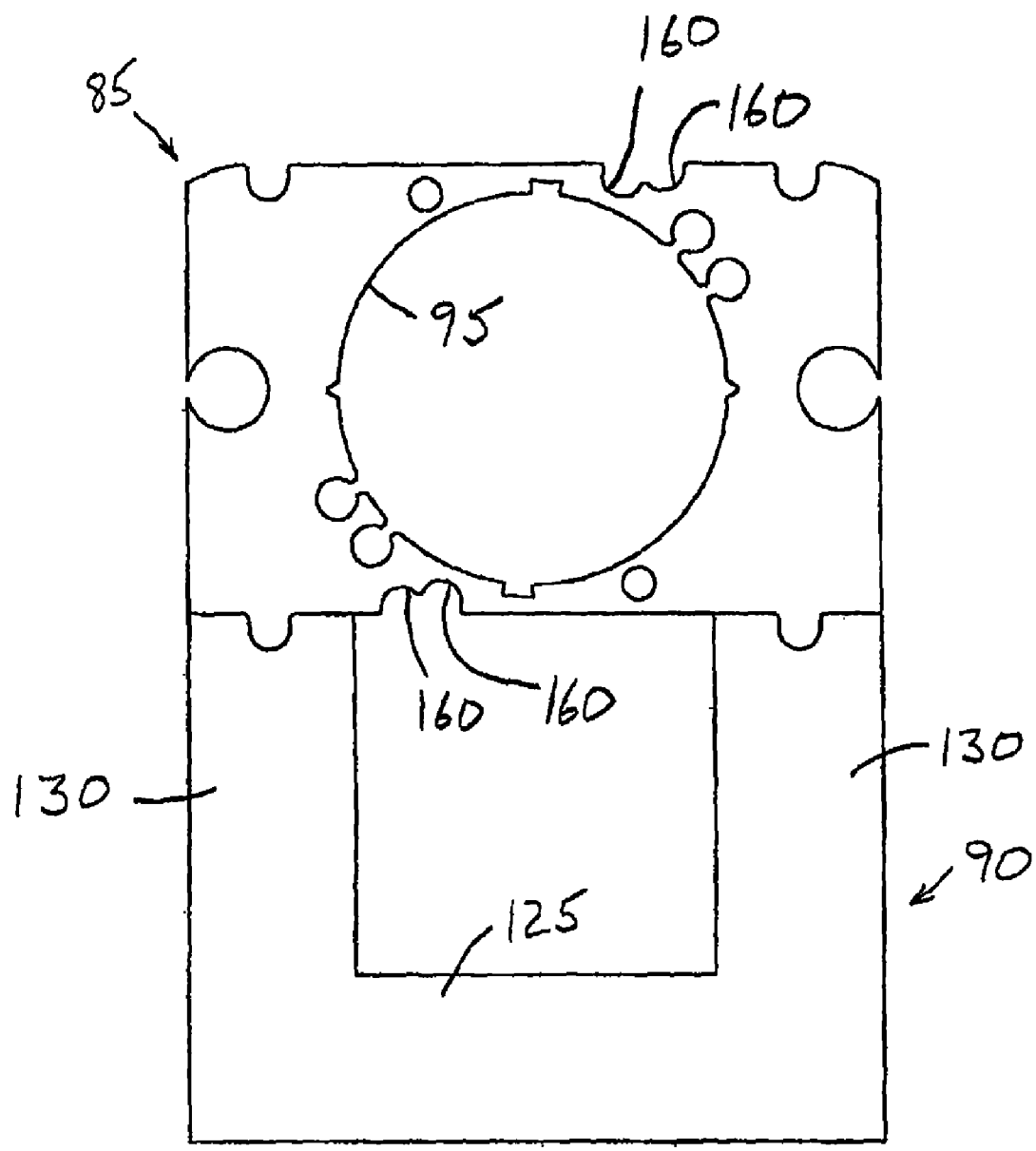

FIGS. 9-14*a* show variations of the stator lamination 80 of FIG. 5. FIG. 9 illustrates a lamination 150 that includes incomplete side holes 155 for use in attaching the end brackets 70 to the stator core 60. In this arrangement, alternative mechanical arrangements are employed for the end-brackets 70. The increase in the equivalent width of the stator magnetic circuit is beneficial for motor operation.

In FIG. 10, the shading coil slots 160 have been repositioned to reduce the mechanical interference with the leg portions 130 and also enlarge the magnetic circuit flux path.

Figure 11:
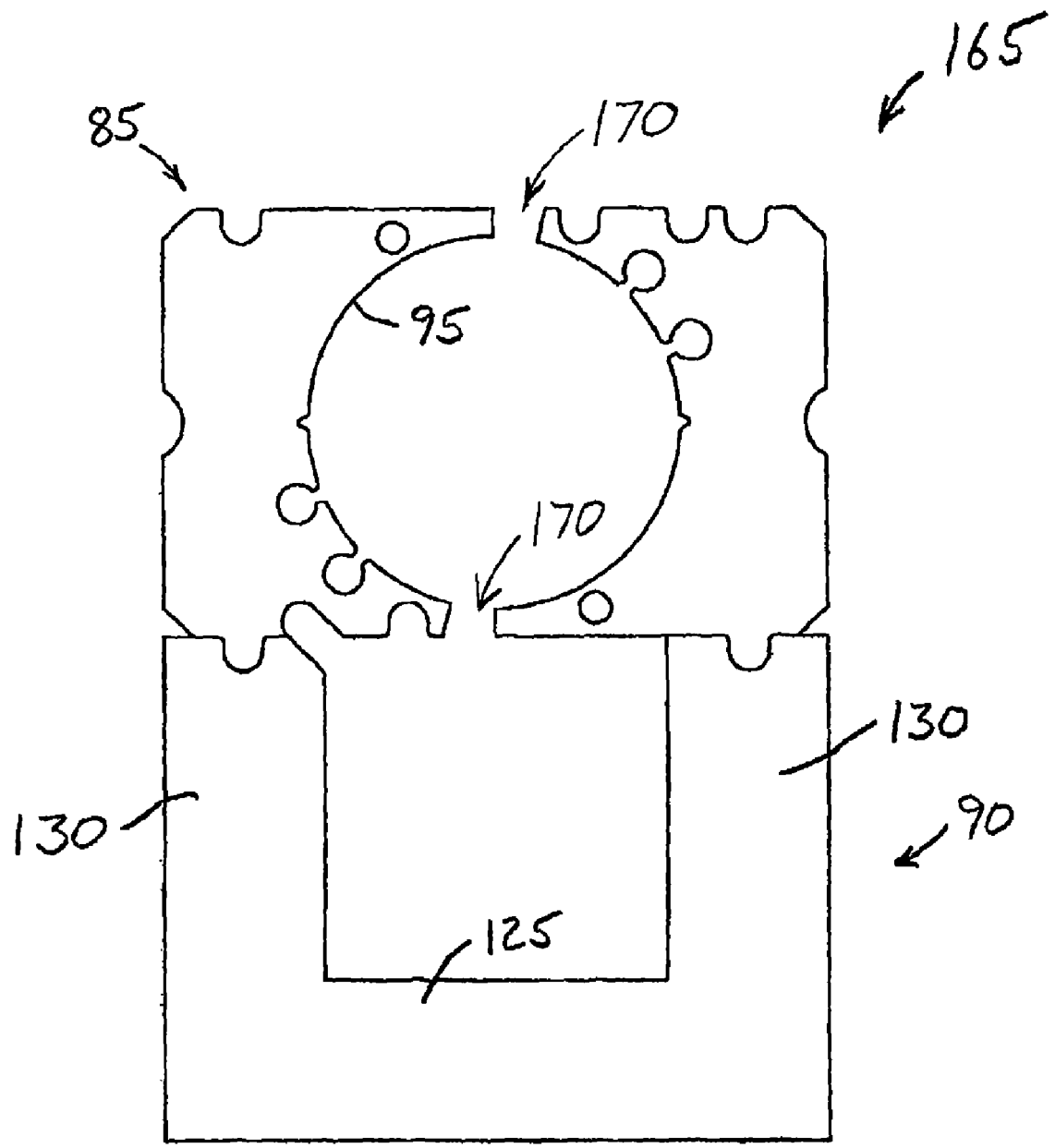
FIG. 11 is a front view of yet another lamination suitable for use in the motor of FIG. 4.
Figure 72:
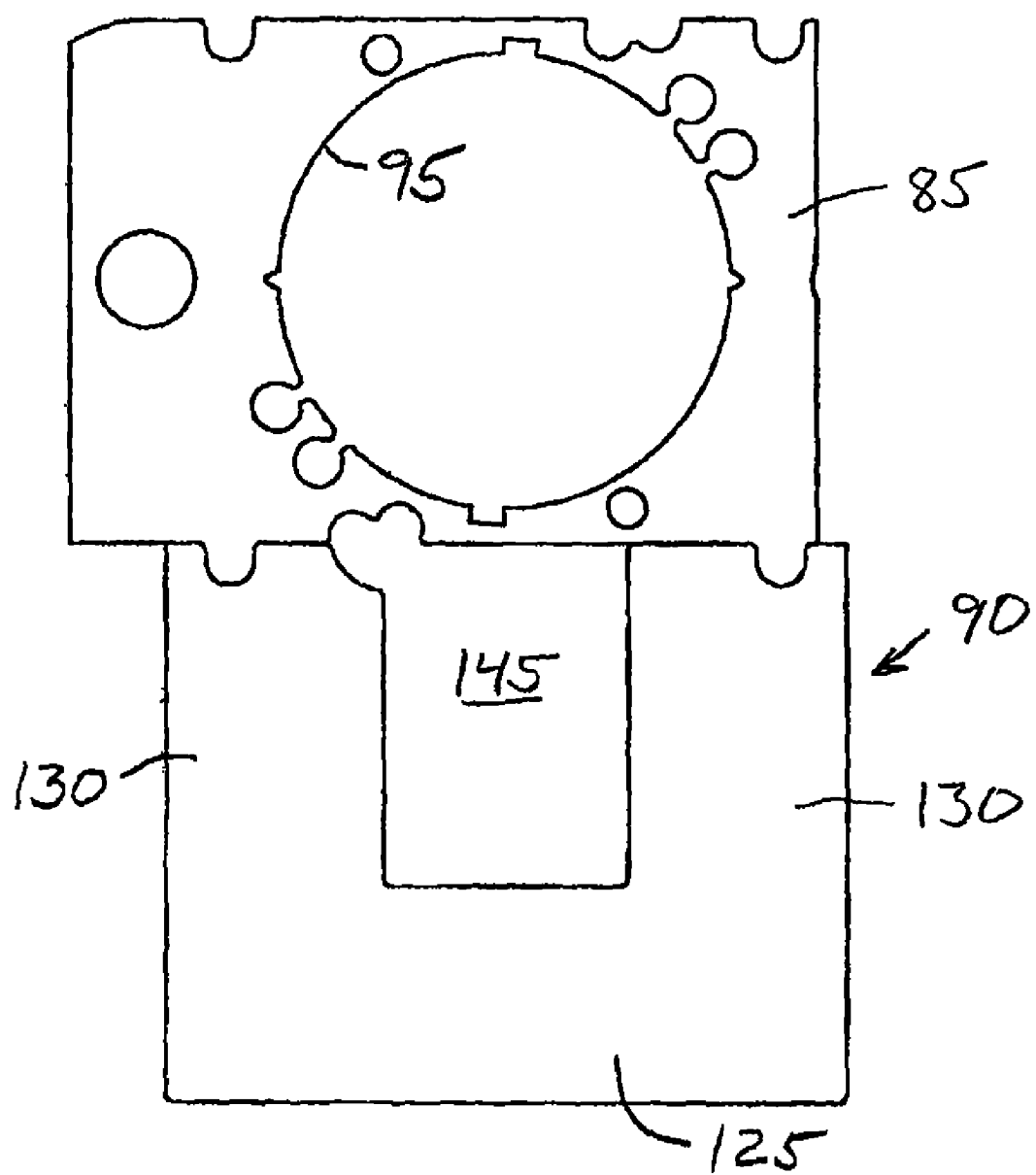

The laminations 165 of FIG. 11 are identical to those of FIG. 9, with the exception of the cuts 170 in the rectangular first lamination piece 85. This arrangement reduces the magnetic leakage flux and/or the flux linking the shading coils and can be beneficial, especially for certain type of motors, such as for example permanent magnet brushless motors, that may or may not include shading coils. It should be noted that such cuts 170 or interruptions in the stator core 35 of a conventional C-frame motor 10 such as is illustrated in FIG. 2 would result in a mechanically weak structure. However, the present arrangement is not weakened to the extent a conventional C-frame motor stator 10 with similar cuts 170 would be weakened.

The construction in FIG. 12 illustrates another advantage and degree of freedom available with the invention described herein. The first lamination piece 85 is shifted with respect to the second lamination pieces 90 and the circular aperture 95 is not centrally-located within the first lamination pieces 85. This results in an increase of the magnetic circuit width in the direction of the flow of the main magnetic flux and a reduction in the direction of the flow of the magnetic flux linking the shading coils and/or of the leakage flux. This construction can be beneficial for brushless DC motors.

Figure 13:
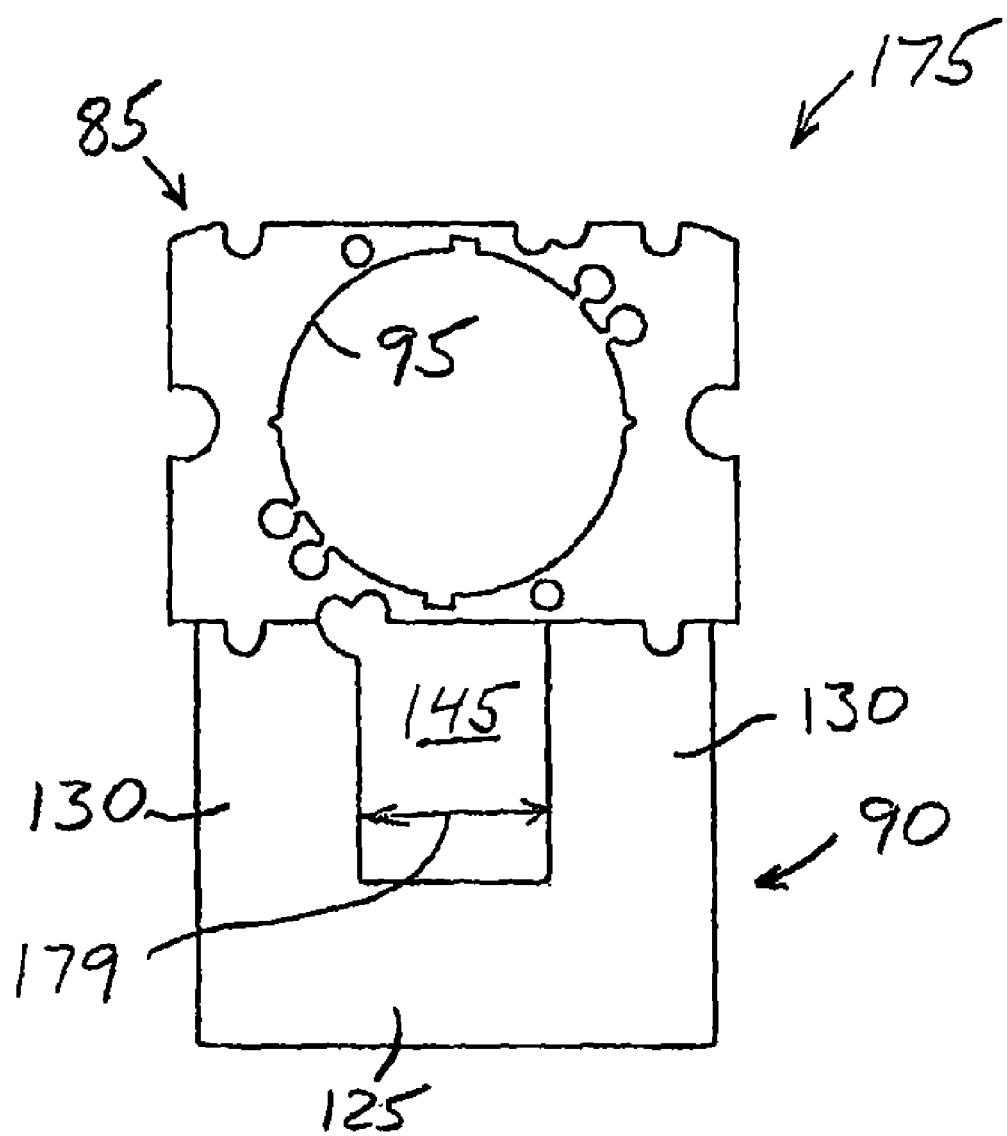
FIG. 13 is a front view of yet another lamination suitable for use in the motor of FIG. 4.
Figure 74:
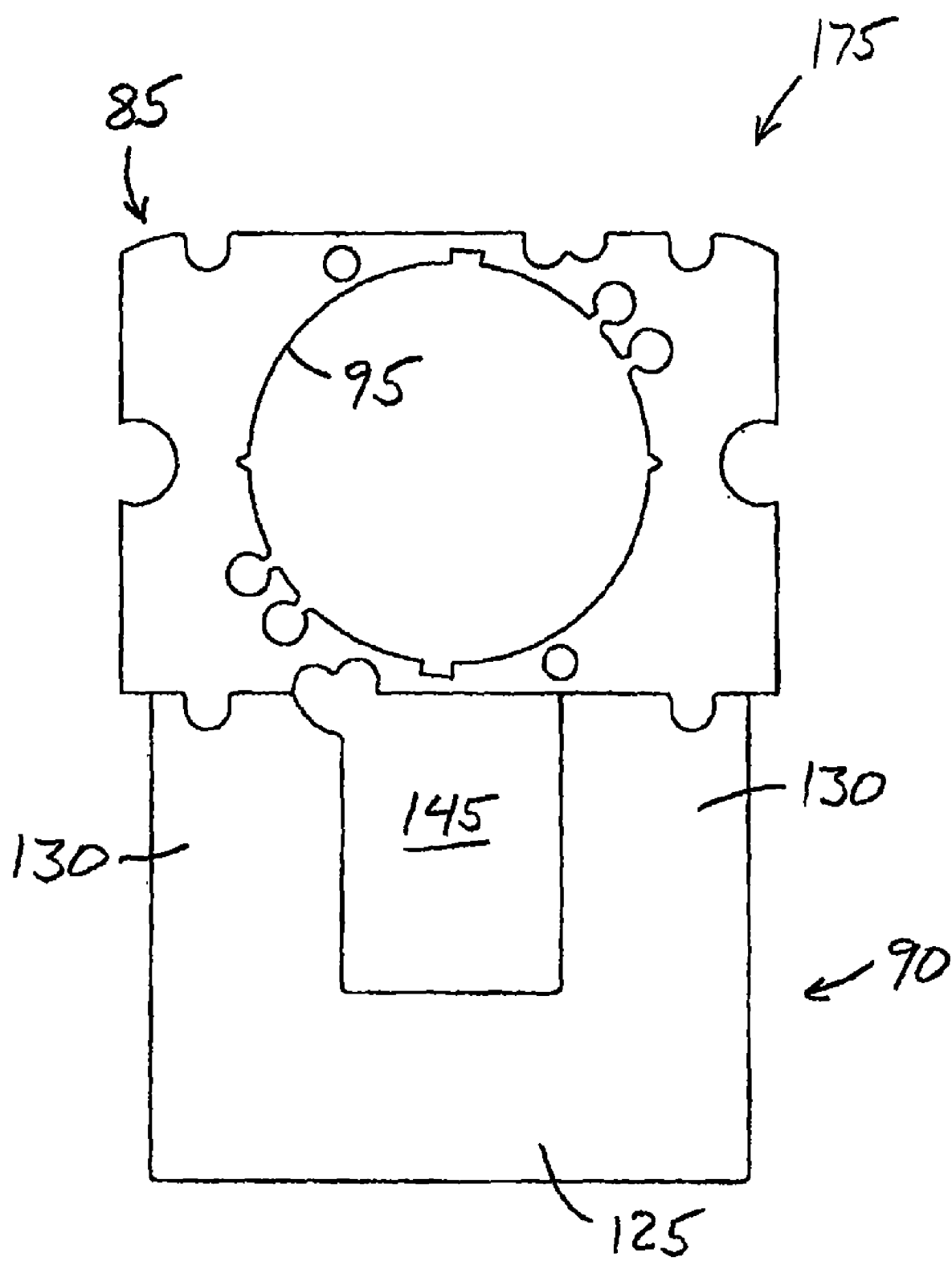

The construction in FIG. 13 illustrates a core 175 in which the overall width of the first lamination pieces 85 and of the second lamination pieces 90 is different. In addition, FIG. 13 illustrates a construction in which the width 179 of the space 145 between the legs 130 is not substantially equal to twice the width of the legs 130 for minimum scrap (see FIG. 8). Rather, the width of the space 145 is about equal to the width of one of the legs 130.

The present invention allows additional degrees of design freedom not only for the motor cross-section, as previously described, but also for the axial (stackwise) dimension. Because the first lamination piece 85 and the second lamination piece 90 are manufactured independent of one another, stator cores having different quantities of first lamination pieces 85 than second lamination pieces 90, as well as different thicknesses, and/or different materials can be employed without increasing scrap.

Figure 14A:
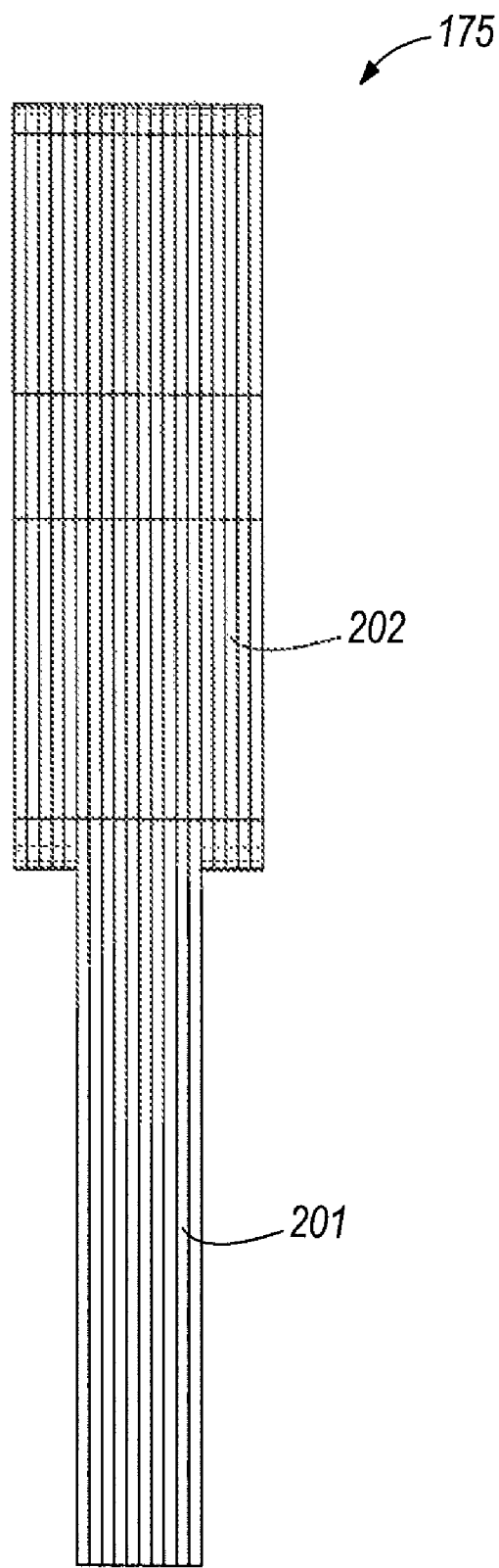
FIG. 14a is a side view of the stator core of FIG. 14.
Figure 75:
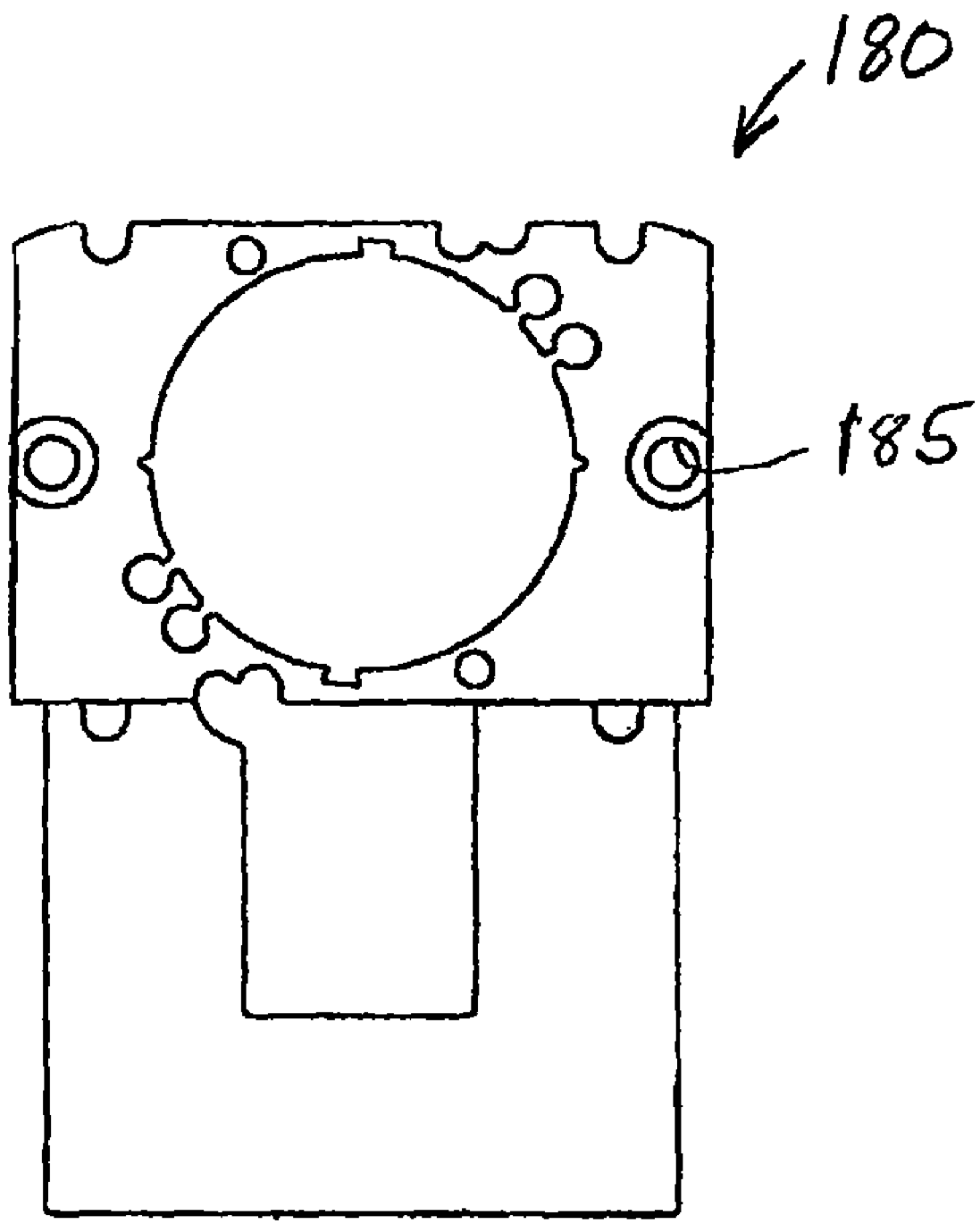

For example, the construction in FIGS. 14 and 14*a* has a shorter stack 201, with fewer second lamination pieces 90 than first lamination pieces 85. Thus, the rectangular portion includes a thicker stack 202 defined by the first lamination pieces 85 that are stacked higher or are thicker in the stackwise or axial direction than the U-shaped portion defined by the second lamination pieces 90. Based on the effect of the axial flux concentration, the detrimental reduction of motor performance is relatively small and yet the economy in the steel consumption can be significant as the amount of steel in the second lamination pieces 90 is substantial. In preferred constructions, the axial length of the U-shaped portion is 10 percent to 40 percent shorter than the axial length of the rectangular portion of the stator core.

Furthermore, different materials can be optimally employed for the first lamination piece 85 and the second lamination piece 90 that cooperate to define the magnetic circuit, as these parts can be punched in completely different processes. In FIG. 7, the legs 130 and 125 are shown as having substantially the same width 176; however this is not an absolute requirement and the dimensions can vary. For example, when punched from a grain-oriented electric steel, the legs 130 should be aligned along the preferential direction of magnetization 177 of the material and the base 125 can have a width 178 that is wider to compensate for the reduction in material performance in this region, thereby enhancing motor performance. In the preferred construction, the upper part lamination 85 and the rotor lamination, which is typically punched in its aperture 95, are manufactured from non-grain oriented electric steel commonly employed for rotating electric motors.

Figure 16:
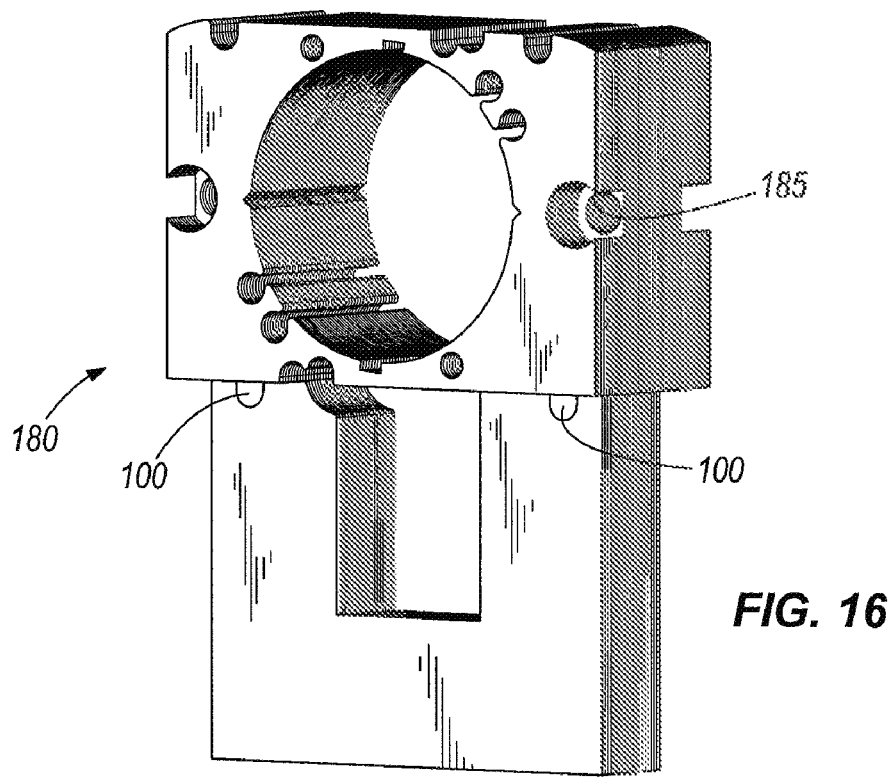
FIG. 16 is a perspective view of the stator core of FIG. 15.
Figure 17:
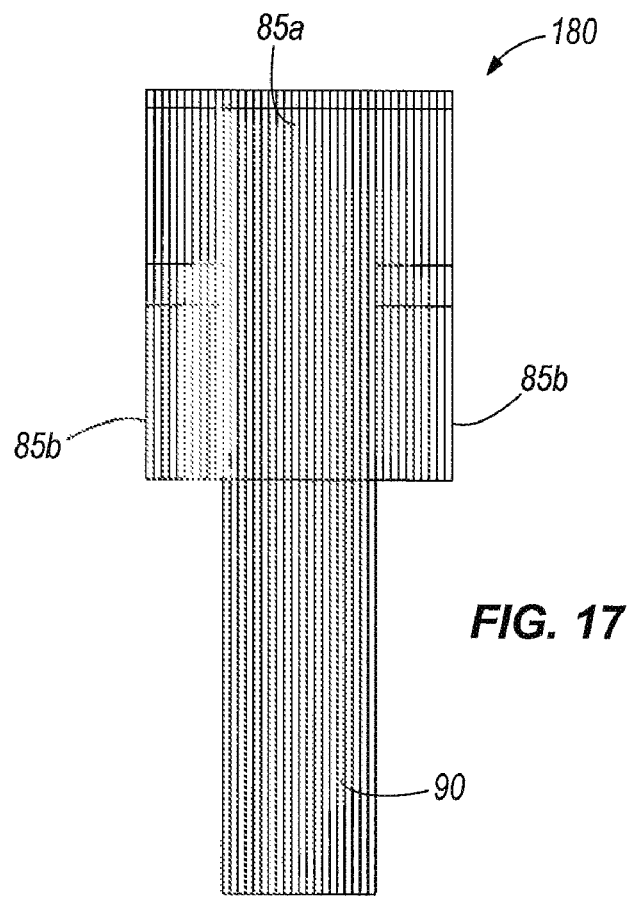
FIG. 17 is a side view of the stator core of FIG. 15.

Also, some of the core/lamination features can vary axially, as exemplified in FIGS. 15-17, in order to enhance the mechanical and electromagnetic performance of the motor. FIGS. 15-17 illustrate a core 180 in which two types of first lamination pieces 85*a*, 85*b* are employed. A first type 85*a* of the first lamination pieces 85 includes complete side holes 115 sized to pass a fastener. A second type 85*b* of the first lamination pieces 85 includes larger side holes 185 that are open and sized, for example, to fit a locating feature of the end-frame (or supporting members 70). In addition, only the first type 85*a* of first lamination pieces 85 include tabs 100 (shown for e.g. in FIG. 16) to engage the second lamination pieces 90 as only the first type 85*a* of lamination pieces engage second lamination pieces 90.

The core 180 of FIGS. 15-17 could include incomplete side holes 185 throughout the thickness of the stator core 190. None of the side holes 185 would be complete. In addition, some of the second type 85*b* of first lamination pieces 85 could include tabs 100 to engage the second lamination pieces 90.

Figure 18:
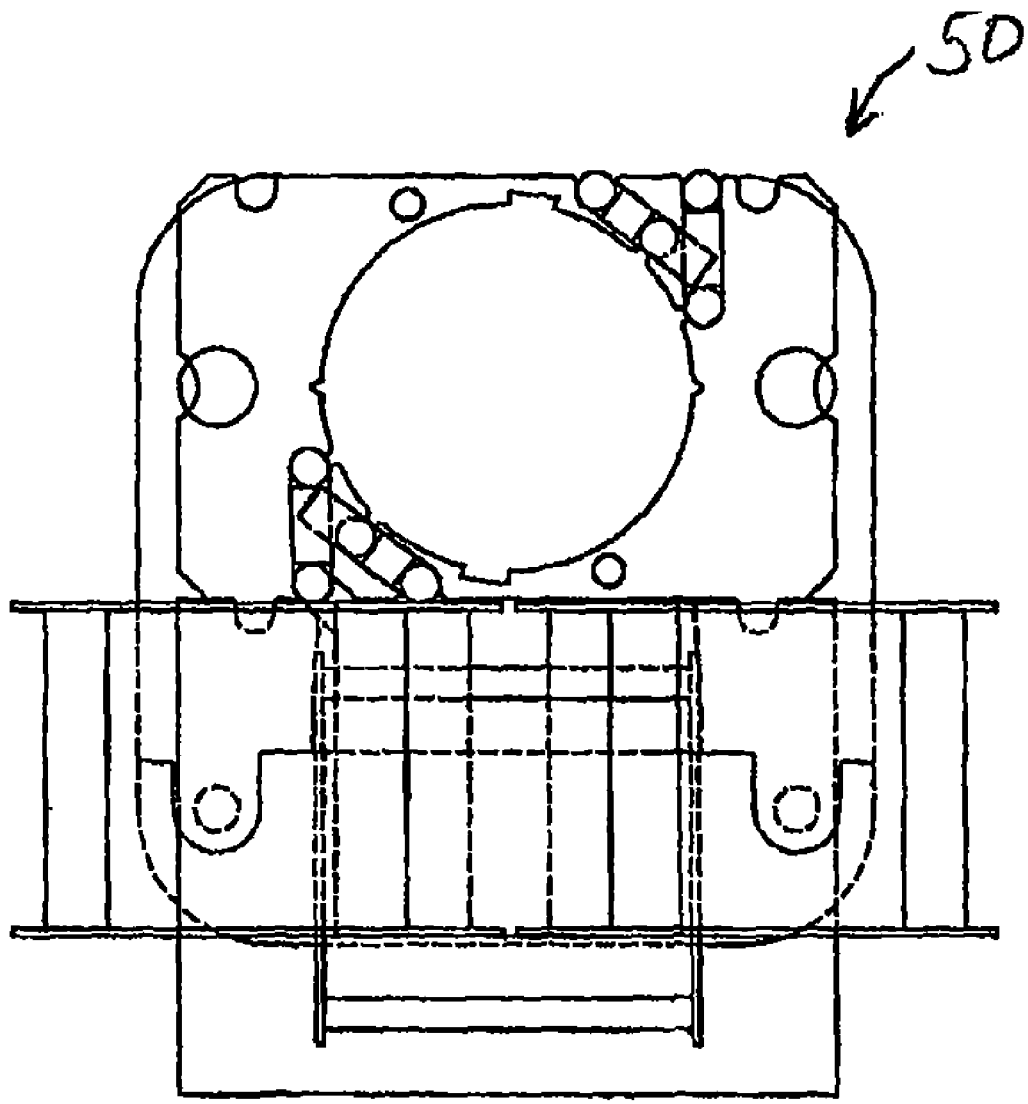
FIG. 18 is a front view of a stator of the type shown in FIG. 4, built with the laminations of FIG. 9 and superimposed over a stator formed from the laminations of FIG. 1.
Figure 19:
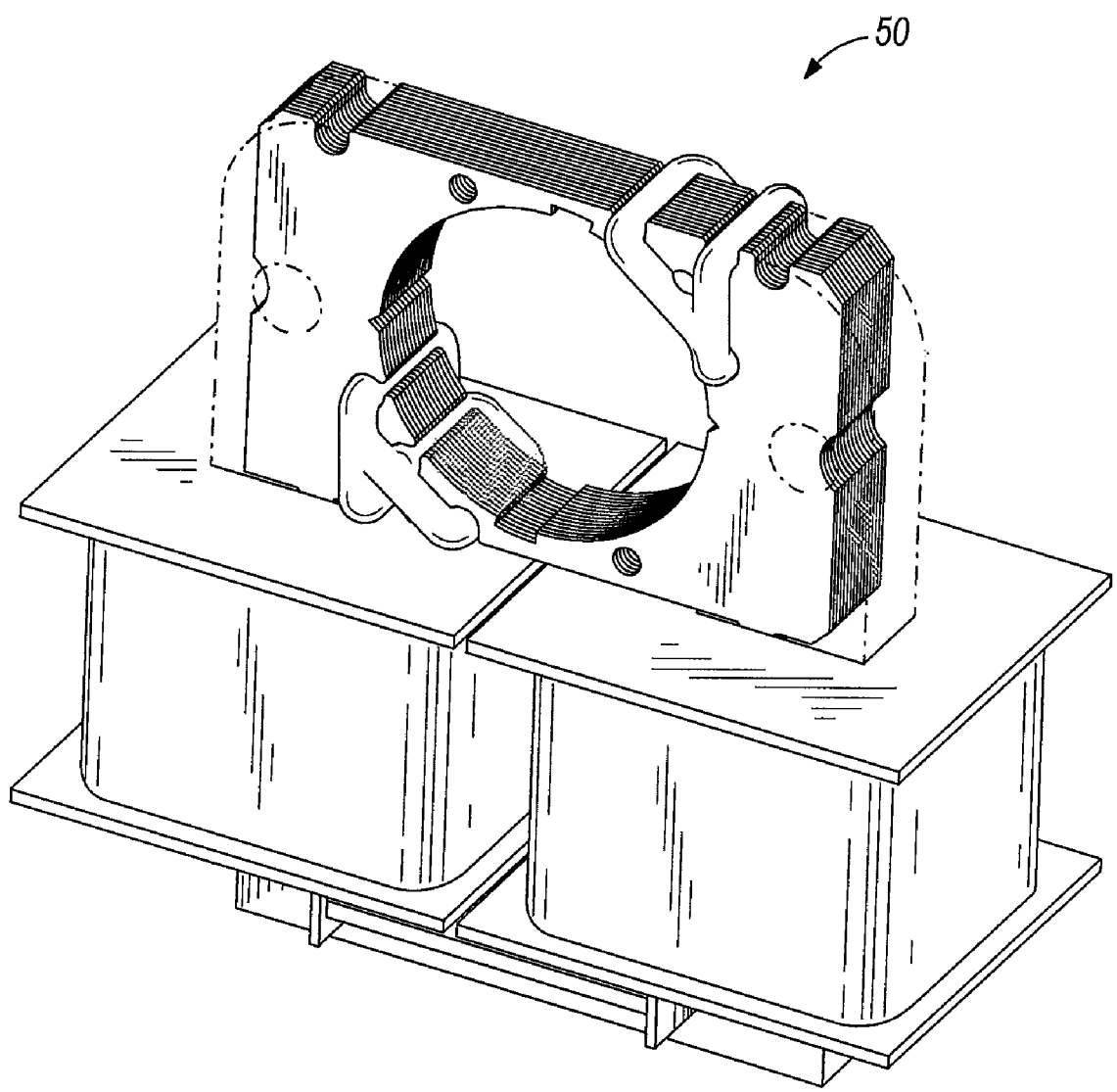
FIG. 19 is a perspective view of a stator of the type shown in FIG. 4, built with the laminations of FIG. 9 and superimposed over a stator formed from the laminations of FIG. 1.

It should be noted that, when used in combination with the same rotor to deliver the same rated performance as a given conventional C-frame motor, a two bobbin motor as illustrated herein can be designed to use a comparable amount of steel, fit a similar envelope (see FIGS. 18 and 19), and replace the copper wire by aluminum wire.

It should also be noted that the foregoing description discussed the use of tabs 100 on the first lamination pieces 85 and slots 135 that receive the tabs 85 in the second lamination pieces 90. However, it should be understood that the location of the tabs 100 and slots 135 could be reversed or otherwise changed if desired. In addition, different mechanisms could be employed to attach the first lamination pieces 85 to the second lamination pieces 90. For the attachment of the laminations in a stack-wise direction different methods, such as interlocking through small protrusions, bonding, gluing, welding, etc can be employed.

Thus, the present invention includes constructions that provide additional degrees of freedom to allow for the optimal design of the stator core for low cost and/or best performance. In addition, the present invention includes constructions that reduce the high-winding resistance and high electric wire consumption often required by single coil C-frame motors. Furthermore, some constructions of the motor can be designed to fit the mounting features and the available space in current applications, the electric copper wire can be replaced by less expensive electric aluminum wire, and/or the output available in combination with a given rotor can be increased in comparison with the conventional C-frame equivalent.

Thus, the invention provides, among other things, a new and useful stator for use in a motor. The stator includes laminations formed from at least two separate pieces.

What is claimed is:

1. An electric machine having a rotor, the electric machine comprising:
   a first portion that is substantially rectangular and includes a rotor aperture configured to receive a portion of the rotor;
   a second portion separate from and connected to the first portion, the second portion being substantially U-shaped and including a first leg, a second leg, and a base;
   a first coil surrounding a portion of the first leg; and
   a second coil surrounding a portion of the second leg, wherein the first portion defines a first thickness and the second portion defines a second thickness measured in a direction parallel to an axis of rotation, wherein the first thickness is different than the second thickness.

2. The electric machine of claim 1, wherein the rotor aperture is not centered within the first portion.

3. The electric machine of claim 1, wherein the first portion includes a first tab and a second tab, and the second portion includes a first slot and a second slot, the first slot configured to receive the first tab and the second slot configured to receive the second tab to connect the second portion to the first portion.

4. The electric machine of claim 1, wherein the first portion is formed from a first material and the second portion is formed from a second material that is different than the first material.

5. The electric machine of claim 1, wherein the first portion has a first width and the second portion has a second width measured in a direction that is perpendicular to an axis of rotation, wherein the second width is less than the first width.

6. The electric machine of claim 1, wherein the first portion includes a plurality of first laminations and a plurality of second laminations stacked in a stackwise direction, the first laminations being different than the second laminations.

7. An electric machine having a rotor, the electric machine comprising:
   a first portion that is substantially rectangular and includes a rotor aperture configured to receive a portion of the rotor;
   a second portion separate from and connected to the first portion, the second portion being substantially U-shaped and including a first leg, a second leg, and a base;
   a first coil surrounding a portion of the first leg; and
   a second coil surrounding a portion of the second leg, wherein the first portion includes a first quantity of first laminations stacked in a stackwise direction and the second portion includes a second quantity of second laminations stacked in the stackwise direction, and wherein the first quantity is different than the second quantity.

8. The electric machine of claim 7, wherein the first laminations include a first tab and a second tab and a first slot and a second slot, and wherein when formed, the first tab and the second tab are formed from the material of the first slot and the second slot of an adjacent first lamination.

9. The electric machine of claim 7, wherein each second lamination includes a first leg portion having a first width and a second leg portion having a second width, and wherein the first leg portion is spaced apart from the second leg portion a distance that is about equal to the sum of the first width and the second width.

10. An electric machine having a rotor, the electric machine comprising:
    a first portion that is substantially rectangular and includes a rotor aperture configured to receive a portion of the rotor;
    a second portion separate from and connected to the first portion, the second portion being substantially U-shaped and including a first leg, a second leg, and a base;
    a first coil surrounding a portion of the first leg; and
    a second coil surrounding a portion of the second leg, wherein the first portion includes a first quantity of first laminations stacked in a stackwise direction and the second portion includes a second quantity of second laminations stacked in the stackwise direction, and wherein each of the first laminations has a first thickness and each of the second laminations has a second thickness that is different than the first thickness.

11. An electric machine having a rotor, the electric machine comprising:
    a first portion that is substantially rectangular and includes a rotor aperture configured to receive a portion of the rotor;
    a second portion separate from and connected to the first portion, the second portion being substantially U-shaped and including a first leg, a second leg, and a base;
    a first coil surrounding a portion of the first leg; and
        a second coil surrounding a portion of the second leg, wherein the first portion includes a first quantity of first laminations stacked in a stackwise direction and the second portion includes a second quantity of second laminations stacked in the stackwise direction, and wherein each second lamination includes a first leg portion having a first width and a second leg portion having a second width equal to the first width, and wherein the first leg portion is spaced apart from the second leg portion a distance that is about equal to the first width.

12. An electric machine having a rotor, the electric machine comprising:
    a first portion that is substantially rectangular and includes a rotor aperture configured to receive a portion of the rotor;
    a second portion separate from and connected to the first portion, the second portion being substantially U-shaped and including a first leg, a second leg, and a base;
    a first coil surrounding a portion of the first leg; and
    a second coil surrounding a portion of the second leg, wherein the first portion includes two side surfaces that define a first center axis equally spaced between the two side surfaces and the second portion defines a second center axis equally spaced between the first leg and the second leg, and wherein the first center axis and the second center axis are not coincident.

13. An electric machine having a rotor, the electric machine comprising:
    a first portion that is substantially rectangular and includes a rotor aperture configured to receive a portion of the rotor;
    a second portion separate from and connected to the first portion, the second portion including a plurality of laminations stacked in a stackwise direction, each lamination including a first leg having a first width, a second leg having a second width, and a base, the base sized to define a space between the first leg and the second leg that is about equal to the sum of the first width and the second width; and a coil surrounding a portion of one of the first leg and the base.

14. The electric machine of claim 13, wherein the rotor aperture is not centered within the first portion.

15. The electric machine of claim 13, wherein the first portion includes a first tab and a second tab, and the second portion includes a first slot and a second slot, the first slot configured to receive the first tab and the second slot configured to receive the second tab to connect the second portion to the first portion.

16. The electric machine of claim 13, wherein the first portion includes a first quantity of first laminations stacked in a stackwise direction and the plurality of laminations includes a second quantity of second laminations stacked in the stackwise direction.

17. The electric machine of claim 16, wherein the first quantity is different than the second quantity.

18. The electric machine of claim 16, wherein each of the first laminations has a first thickness and each of the second laminations has a second thickness that is different than the first thickness.

19. The electric machine of claim 16, wherein the first laminations include a first tab and a second tab and a first slot and a second slot, and wherein when formed, the first tab and the second tab are formed from the material of the first slot and the second slot of an adjacent first lamination.

20. The electric machine of claim 13, wherein the first portion is formed from a first material and the second portion is formed from a second material that is different than the first material.

21. The electric machine of claim 13, wherein the first portion defines a first thickness and the second portion defines a second thickness measured in a direction parallel to an axis of rotation, wherein the first thickness is different than the second thickness.

22. The electric machine of claim 13, wherein the first portion has a first width and the second portion has a second width measured in a direction that is perpendicular to an axis of rotation, wherein the second width is less than the first width.

23. The electric machine of claim 13, wherein the first portion includes two side surfaces that define a first center axis equally spaced between the two side surfaces and the second portion defines a second center axis equally spaced between the first leg and the second leg, and wherein the first center axis and the second center axis are not coincident.

24. The electric machine of claim 13, wherein the first portion includes a plurality of first laminations and a plurality of second laminations stacked in a stackwise direction, the first laminations being different than the second laminations.

25. The electric machine of claim 13, wherein the coil surrounds a portion of the first leg, and wherein a second coil surrounds a portion of the second leg.

26. An electric machine comprising:
a first portion including a first quantity of first laminations stacked in a stackwise direction, each first lamination being substantially rectangular and including a first tab, a second tab, and a rotor aperture;
a rotor at least partially disposed within the rotor aperture and rotatable about an axis that extends in the stackwise direction;
a second portion including a second quantity of second laminations stacked in the stackwise direction, each second lamination including a first leg having a first slot, a second leg having a second slot, and a base, a portion of the first slots configured to receive a portion of the first tabs, and a portion of the second slots configured to receive a portion of the second tabs to connect the second quantity of second laminations to the first quantity of first laminations; and
a coil surrounding a portion of one of the first leg and the base, wherein the first laminations cooperate to define a first thickness and the second laminations cooperate to define a second thickness measured in a direction parallel to an axis of rotation, wherein the first thickness is different than the second thickness.

27. The electric machine of claim 26, wherein the rotor aperture is not centered within the first portion.

28. The electric machine of claim 26, wherein the first quantity is different than the second quantity.

29. The electric machine of claim 26, wherein each of the first laminations has a first thickness and each of the second laminations has a second thickness that is different than the first thickness.

30. The electric machine of claim 26, wherein the first laminations include a first slot and a second slot, and wherein when formed, the first tab and the second tab are formed from the material of the first slot and the second slot of an adjacent first lamination.

31. The electric machine of claim 26, wherein the first laminations are formed from a first material and the second laminations are formed from a second material that is different than the first material.

32. The electric machine of claim 26, wherein the first laminations have a first width and the second laminations have a second width measured in a direction that is perpendicular to an axis of rotation, wherein the second width is less than the first width.

33. The electric machine of claim 26, wherein the first laminations include two side surfaces that define a first center axis equally spaced between the two side surfaces and the second laminations define a second center axis equally spaced between the first leg and the second leg, and wherein the first center axis and the second center axis are not coincident.

34. The electric machine of claim 26, wherein the coil surrounds a portion of the first leg, and wherein a second coil surrounds a portion of the second leg.

35. An electric machine comprising:
a first portion including a first quantity of first laminations stacked in a stackwise direction, each first lamination being substantially rectangular and including a first tab, a second tab, and a rotor aperture;
a rotor at least partially disposed within the rotor aperture and rotatable about an axis that extends in the stackwise direction;
a second portion including a second quantity of second laminations stacked in the stackwise direction, each second lamination including a first leg having a first slot, a second leg having a second slot, and a base, a portion of the first slots configured to receive a portion of the first tabs, and a portion of the second slots configured to receive a portion of the second tabs to connect the second quantity of second laminations to the first quantity of first laminations; and
a coil surrounding a portion of one of the first leg and the base, wherein each first leg has a first width and each second leg has a second width, and wherein the first leg is spaced apart from the second leg a distance that is about equal to the sum of the first width and the second width.

36. An electric machine comprising:

a first portion including a first quantity of first laminations stacked in a stackwise direction, each first lamination being substantially rectangular and including a first tab, a second tab, and a rotor aperture;

a rotor at least partially disposed within the rotor aperture and rotatable about an axis that extends in the stackwise direction;

a second portion including a second quantity of second laminations stacked in the stackwise direction, each second lamination including a first leg having a first slot, a second leg having a second slot, and a base, a portion of the first slots configured to receive a portion of the first tabs, and a portion of the second slots configured to receive a portion of the second tabs to connect the second quantity of second laminations to the first quantity of first laminations; and a coil surrounding a portion of one of the first leg and the base, wherein each first leg has a first width and each second leg has a second width equal to the first width, and wherein the first leg is spaced apart from the second leg a distance that is about equal to the first width.

37. An electric machine comprising:

a first portion including a first quantity of first laminations stacked in a stackwise direction, each first lamination being substantially rectangular and including a first tab, a second tab, and a rotor aperture;

a rotor at least partially disposed within the rotor aperture and rotatable about an axis that extends in the stackwise direction;

a second portion including a second quantity of second laminations stacked in the stackwise direction, each second lamination including a first leg having a first slot, a second leg having a second slot, and a base, a portion of the first slots configured to receive a portion of the first tabs, and a portion of the second slots configured to receive a portion of the second tabs to connect the second quantity of second laminations to the first quantity of first laminations;

a coil surrounding a portion of one of the first leg and the base; and a third quantity of third laminations, wherein the first laminations and the third laminations are stacked in the stackwise direction to define the first portion.

\* \* \* \* \*